US011157058B2

(12) United States Patent
Hefner et al.

(10) Patent No.: US 11,157,058 B2
(45) Date of Patent: Oct. 26, 2021

(54) SETTING POLLING INTERVAL OF OPEN/CLOSED POSITION SENSOR FOR A MOVABLE PORTION OF AN ELECTRONIC DEVICE BASED ON ACTIVITY STATE OF THE ELECTRONIC DEVICE

(71) Applicant: MOTOROLA MOBILITY LLC, Chicago, IL (US)

(72) Inventors: Eric J. Hefner, Lombard, IL (US); John S. Ratke, Chicago, IL (US); Jenna M. Zylema, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 161 days.

(21) Appl. No.: 16/425,899

(22) Filed: May 29, 2019

(65) Prior Publication Data

US 2020/0379538 A1 Dec. 3, 2020

(51) Int. Cl.
*G06F 1/3206* (2019.01)
(52) U.S. Cl.
CPC .................... *G06F 1/3206* (2013.01)
(58) Field of Classification Search
CPC ...................................................... G06F 1/3206
See application file for complete search history.

(56) References Cited

U.S. PATENT DOCUMENTS

| 6,434,404 B1* | 8/2002 | Claxton | H04M 1/0214 |
| | | | 455/575.3 |
| 6,615,059 B1* | 9/2003 | Pehrsson | H04M 1/0214 |
| | | | 455/550.1 |
| 2003/0017810 A1* | 1/2003 | Janninck | H04M 1/0243 |
| | | | 455/575.1 |
| 2005/0020097 A1* | 1/2005 | Kawahigashi | H04M 1/0245 |
| | | | 439/38 |
| 2006/0073844 A1* | 4/2006 | Chan | H04M 1/0245 |
| | | | 455/550.1 |

(Continued)

FOREIGN PATENT DOCUMENTS

| JP | 2776783 B2 | 7/1998 |
| JP | 2009021749 A | 1/2009 |

(Continued)

OTHER PUBLICATIONS

Patent Cooperation Treaty, International Application No. PCT/US20/35046, International Search Report, dated Aug. 28, 2020.

(Continued)

*Primary Examiner* — Gary Collins
(74) *Attorney, Agent, or Firm* — Isidore PLLC (57) ABSTRACT

An electronic device detects ambient contextual data and positioning data such as orientation and motion to determine an activity state of the electronic device. A controller sets a polling interval of an open/closed position sensor that is connected to a movable portion connected to a base to detect an open/closed event. In response to determining a first activity state, controller sets a first polling interval that mitigates power consumption. In response to determining a second activity state, the controller sets the polling interval to a second polling interval that is shorter than the first polling interval to reduce latency in detecting the open/closed event.

20 Claims, 8 Drawing Sheets

(56) References Cited

U.S. PATENT DOCUMENTS

| | | | |
|---|---|---|---|
| 2006/0155391 A1* | 7/2006 | Pistemaa | H04N 5/2251 |
| | | | 700/17 |
| 2008/0315865 A1* | 12/2008 | Doogue | G01P 3/487 |
| | | | 324/173 |
| 2009/0153138 A1 | 6/2009 | Theuss | |
| 2009/0227293 A1* | 9/2009 | Yulo | H04W 52/0254 |
| | | | 455/566 |
| 2009/0312075 A1* | 12/2009 | Kimbrell | H04M 1/0245 |
| | | | 455/575.3 |
| 2011/0092254 A1* | 4/2011 | Bestle | H04M 1/23 |
| | | | 455/566 |
| 2016/0345406 A1* | 11/2016 | Donhowe | H05B 47/105 |
| 2017/0056722 A1* | 3/2017 | Singh | G16H 40/67 |
| 2017/0212265 A1 | 7/2017 | Nakayama et al. | |
| 2020/0294533 A1* | 9/2020 | Shen | G06F 1/1647 |

FOREIGN PATENT DOCUMENTS

| | | |
|---|---|---|
| KR | 1020160098719 A | 8/2016 |
| WO | 2015126095 A1 | 8/2015 |

OTHER PUBLICATIONS

Patent Cooperation Treaty, International Application No. PCT/US20/35046, Written Opinion, dated Aug. 28, 2020.

\* cited by examiner

SETTING POLLING INTERVAL OF OPEN/CLOSED POSITION SENSOR FOR A MOVABLE PORTION OF AN ELECTRONIC DEVICE BASED ON ACTIVITY STATE OF THE ELECTRONIC DEVICE

BACKGROUND

1. Technical Field

The present disclosure relates generally to electronic devices that are configurable in an open and a closed position and in particular to electronic devices having a movable portion and a sensor that detects an open/closed position of the movable portion.

2. Description of the Related Art

Some electronic devices include a movable portion that, in some devices, serve as a protective cover to components such as a user interface device, when the user interface device is not in use. The movable portion can also reduce the overall size (or the form factor) of the electronic device making the device easier to stow. For example, a smaller device, such as a mobile phone, can be stowed in a pocket of a user. Generally-known electronic devices with a movable portion, such as a slide or flip portion, include a magnetic or mechanical proximity sensor that detects when the movable portion is open or closed.

Mechanical proximity sensors require little to no electrical power to function. However, because mobile electronic devices can receive frequent use, i.e., used numerous times during the day, proximity sensors with mechanical moving components tend to wear out and fail.

Magnetic proximity sensors, such as Hall Effect sensors, also require little electrical power to function and also do not have mechanical moving components that are subject to wear. However, users of the electronic device can place the electronic device near strong magnetic fields that would negatively affect the magnetic proximity sensor by falsely detecting an actuation that did not occur or failing to detect an actuation that did occur.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present innovation, a mobile electronic device, a method, and a computer program product provide open/closed position sensing of a movable portion of the mobile electronic device. The mobile electronic device has a movable portion connected to a base. An open/closed position sensor is attached to at least one of the base and the movable portion. The open/closed position sensor is electrically actuated to detect at least one of an open position and a closed position of the movable portion relative to the base. An activity sensor detects one or more of: (i) ambient contextual data; and (ii) positioning data related to at least one of an orientation and a motion of the mobile electronic device. A controller is communicatively coupled to the open/closed position sensor, and the activity sensor. The controller executes an open/closed position detection utility that enables the mobile electronic device to provide specific functionality described herein.

In one or more embodiments, the open/closed position sensing is performed by an electrically-activated proximity sensor, such as an inductive proximity sensor, to avoid mechanical wear out and inadvertent magnetic interaction with the external environment. A controller adjusts a polling interval of the electrically-activated proximity sensor to optimize power consumption and reduce detection latency, based on an activity state of the mobile electronic device.

In one or more embodiments, the functionality includes intermittently activating the open/closed position sensor during an on-cycle of a polling interval to sense a position of the movable portion. The functionality includes intermittently deactivating the open/closed position sensor during an off-cycle of the polling interval to mitigate power consumption by the open/closed position sensor. According to one aspect of the disclosure, a duration of the off-cycle defines a period of latency in detecting an open/closed event involving a transition between the open and closed positions of the movable portion. In response to determining, based on input received from the open/closed position sensor, that the movable portion has transitioned between the closed position and the open position, the functionality includes determining, based on data detected by the activity sensor, whether the mobile electronic device is in a selected one of: (i) a first activity state; and (ii) a second activity state. The first and second activity states are indicative respectively of a first and a second probability of the movable portion transitioning between the closed position and the open position. The first probability is lower than the second probability. For example, a first state can be determined for a mobile electronic device not being readily accessible to a user, either lying stationary or being in a dark enclosure. When not readily accessible to the user, the movable portion is unlikely to change position. Furthermore, the mobile electronic device is likely to change to a second state of motion before the user actuates the movable portion. For another example, the mobile electronic device can be in-motion, carried by and in close, detected proximity to a user. When the mobile electronic device is in proximity to the user, a higher probability exists for the user choosing to change the position of the movable portion as compared to when the mobile electronic device is not readily accessible to the user.

In response to determining that the mobile electronic device is in the first activity state, the functionality includes setting the polling interval of the open/closed proximity switch to a first polling interval that reduces power consumption by the open/closed proximity switch. In response to determining that the mobile electronic device is in the second activity state, the functionality includes setting the polling interval of the open/closed proximity switch to a second polling interval that is shorter than the first polling interval to reduce the period of latency as compared to the first polling interval.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Figure 1:
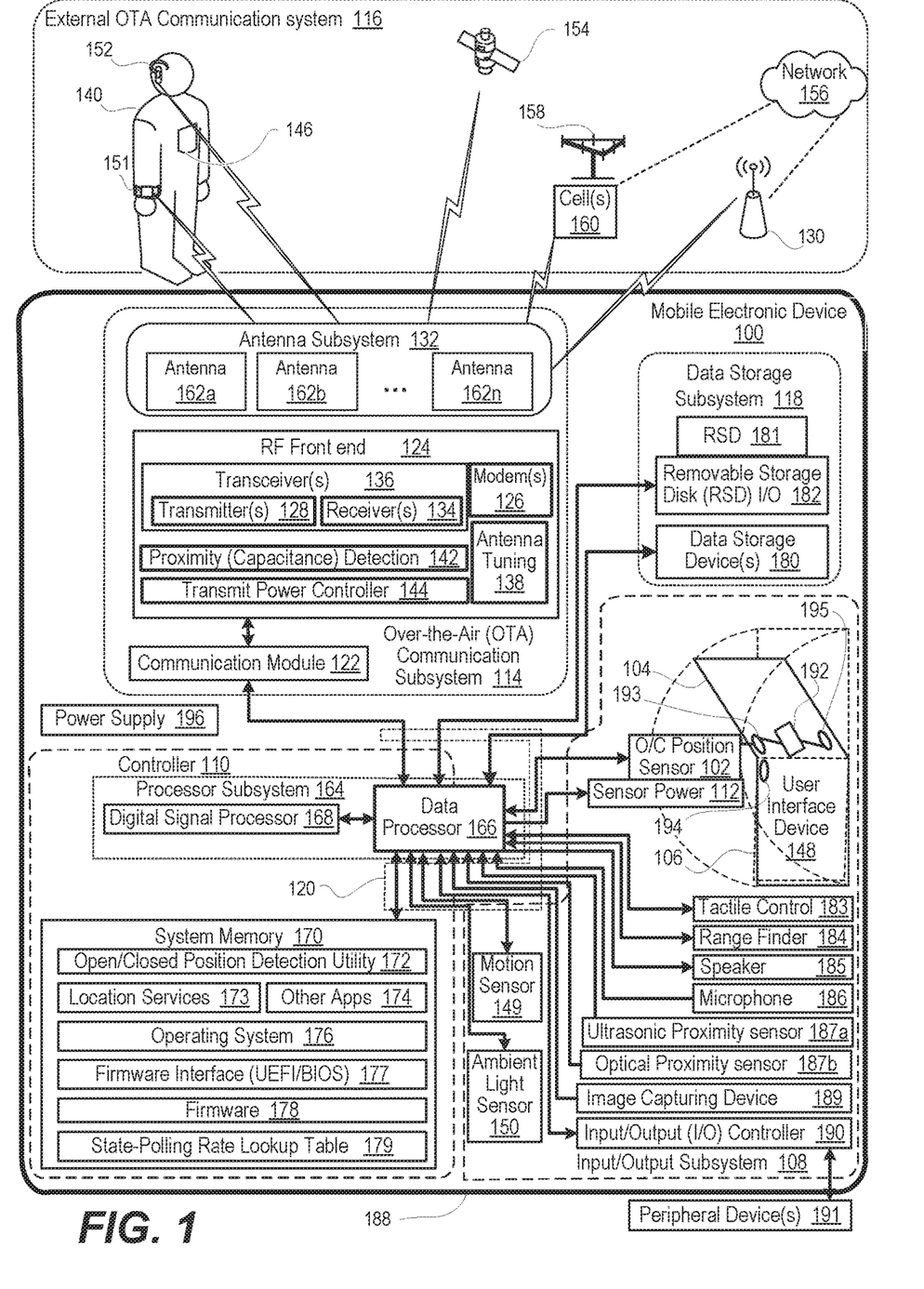
FIG. 1 is a functional block diagram of a mobile electronic device having a reliable open/closed position sensor that is dynamically set to trade-off power consumption for latency as contextually appropriate based on an activity state of the mobile electronic device, according to one or more embodiments.

FIG. 1 is a functional block diagram illustrating example mobile electronic device 100 having open/closed position sensor 102 that reliably senses an open and a closed position of movable portion 104 connected to base 106 of mobile electronic device 100. In one or more embodiments, input/output subsystem 108 serves as an "activity sensor" for determining an activity state of mobile electronic device 100. Controller 110 of mobile electronic device 100 activates open closed proximity sensor 102 according to a polling interval gated by, or dynamically adjusted by, the activity state to balance power consumption and latency in detection of the open/closed position. Controller 110 can switch on sensor power component 112 during an on-cycle of the polling interval to electrically activate open/closed position sensor 102 followed by switching off sensor power component 112 during an off-cycle of the polling interval to deactivate open/closed position sensor 102.

Mobile electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, mobile electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Mobile electronic device 100 can also be an over-the-air link in a communication system. Mobile electronic device 100 can be intended to be portable, hand-held, wearable, detachable, positioned in a fixed location, or mounted to a movable vehicle. Examples of such over-the-air link electronic devices 100 include a wireless modem, an access point, a repeater, a wirelessly-enabled kiosk or appliance, a femtocell, a small coverage area node, and a wireless sensor, etc. Mobile electronic device 100 can have computing functionality directed to local functionality without wide area communication capabilities.

Referring now to the specific component makeup and the associated functionality of the presented components, mobile electronic device 100 includes over-the-air (OTA) communication subsystem 114 that communicates with external OTA communication system 116. Mobility electronic device 100 provides computing and data storage functionality in support of OTA communication with external OTA communication system 116. Mobility electronic device 100 also provides other functions with controller 110, data storage subsystem 118, and input/output (I/O) subsystem 108 that are communicatively coupled to each other via a system interlink 120.

OTA communication subsystem 114 includes communication module 122 that operates in baseband to encode data for transmission and decodes received data, according to a predetermined communication protocol. OTA communication subsystem 114 includes radio frequency (RF) front end 124 having one or more modem(s) 126. Modem(s) 126 modulate baseband encoded data from communication module 122 onto a carrier signal to provide a transmit signal that is amplified by transmitter(s) 128. Modem(s) 126 demodulates the received signal from node 130 detected by antenna subsystem 132. The received signal is amplified and filtered by receiver(s) 134, which demodulate received encoded data from a received carrier signal. Antenna tuning circuitry 138 adjusts an antenna impedance of antenna subsystem 132. Antenna tuning circuitry 138 improves an antenna efficiency at desired transmit or receive frequencies of transmitter(s) 128 and receiver(s) 134, respectively, within transceiver(s) 136. In one or more embodiments, mobile electronic device 100 is proximate to, or on, a body generating a lossy dielectric effect for mobile electronic device 100. Antenna tuning circuitry 138 is electrically coupled to antenna subsystem 132 to compensate for a lossy dielectric effect. Human proximity detection can be based on capacitive coupling of person 140 with antenna subsystem 132. Capacitive proximity detection component 142 of RF front end 124 can trigger transmission power controller 144 to limit power of an uplink transmission. As an additional activity sensor for mobile device 100, capacitive proximity detection component 142 can communicate a positive indication of human proximity. Detecting human proximity to the mobile electronic device 100 can be generally associated with an activity state having a higher probability of the user opening movable portion 104. An example of such a state is when mobile electronic device 100 is being carried in a hand. However, there are exceptions where human proximity is not associated with a high probability of the user opening movable portion 104. Rather, with these exceptions, human proximity can occur in an activity state having a lower probability of user opening movable portion 104. An example of such a state is when mobile electronic device 100 is stowed in an enclosure 146, such as a handbag, pocket, vehicle compartment, luggage, and closet. When mobile electronic device 100 is in such an enclosure, additional context, such as low ambient light, etc., provide an indication that the mobile electronic device 100 is in the first activity state rather than the second activity state.

Controller 110 controls the OTA communication subsystem 114, user interface device 148, and other functions and/or operations of mobile electronic device 100. These functions and/or operations of mobile electronic device 100 include, but are not limited to including, application data processing and signal processing. Mobile electronic device 100 may use hardware component equivalents for application data processing and signal processing. For example, mobile electronic device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components.

In one or more embodiments, user interface device 148 is attached to at least one of base 106 and movable portion 104. User interface device 148 is exposed when movable portion 104 is in an open position and is at least partially hidden when movable portion 104 is in the closed position. Motion sensor 149 of input/output subsystem 108 can also trigger activation of user interface device 148. Ambient light sensor 150 of input/output subsystem 108 can also trigger changes in illumination level of user interface device 148. Ambient light sensor 150 used functionally in combination with optical proximity sensor 187b can also be used as an activity sensor for determining when mobile user device 100 is stowed in enclosure 146. Although certain direct interconnections (interlink 120) are illustrated in FIG. 1, it is to be understood that more, fewer, or different interconnections may be present in other embodiments.

In one or more embodiments, controller 110, via OTA communication subsystem 114, performs multiple types of OTA communication with external OTA communication system 116. OTA communication subsystem 114 can communicate with one or more personal access network (PAN) devices within external OTA communication system 116, such as smart watch 151 and wireless headset 152 that are reached via Bluetooth connection. In one or more embodiments, OTA communication subsystem 114 communicates with one or more locally networked devices via a wireless local area network (WLAN) link provided by WLAN node 130. WLAN node 130 is in turn connected to wide area network 156, such as the Internet. In one or more embodiments, OTA communication subsystem 114 communicates with global positioning system (GPS) satellites 154 to obtain geospatial location information. In one or more embodiments, OTA communication subsystem 114 communicates with radio access network (RAN) 158 having respective base stations (BSs) or cells 160. RANs 158 are a part of a wireless wide area network (WWAN) that is connected to wide area network 156 and provides data and voice services. In one or more embodiments, antenna subsystem 132 includes multiple antenna elements 162a-n that are individually tuned to selected RF bands to support different RF communication bands and protocols. Antenna elements 162a-n can be used in combination for multiple input multiple output (MIMO) operation for beam steering and spatial diversity.

Controller 110 includes processor subsystem 164, which executes program code to implement various functions of mobile electronic device 100. Processor subsystem 164 includes one or more central processing units (CPUs) ("data processor") 166. In one or more embodiments, processing subsystem 164 includes a digital signal processor (DSP)

168. Controller 110 includes system memory 170, which contains actively used program code and data. In one or more embodiments, system memory 170 includes therein a plurality of such program code and modules, including applications such as open/closed position detection utility 172, location services application 173 and other applications 174. System memory 170 can also include operating system (OS) 176, firmware interface 177 such as basic input/output system (BIOS) or Uniform Extensible Firmware Interface (UEFI), and platform firmware 178. These software and/or firmware modules have varying functionality when their corresponding program code is executed by processor subsystem 164 or secondary processing devices within mobile electronic device 100. System memory 170 contains data such as activity state-polling rate lookup table 179

Data storage subsystem 118 provides nonvolatile storage accessible to controller 110. For example, data storage subsystem 118 can provide a large selection of other applications 174 that can be loaded into system memory 170. In one or more embodiments, local data storage device(s) 180 includes hard disk drives (HDDs), optical disk drives, solid state drives (SSDs), etc. In one or more embodiments, removable storage device (RSD) 181 that is received in RSD interface 182 is a computer program product or computer readable storage device, which can be referred to as non-transitory. RSD 181 can be accessed by controller 110 to provision mobile electronic device 100 with program code. When executed by controller 110, the program code provides the functionality to mobile electronic device 100 to perform aspects of the present innovation described herein.

I/O subsystem 108 includes input and output devices such as user interface device 148. User interface device 148 presents visual or tactile outputs as well as receive user inputs. Tactile/haptic control 183 provides an interface such as for braille reading or manual inputs. Range finder 184 emits a waveform of energy, such as acoustic, infrared, radio frequency (RF), etc., whose time of flight is used to measure distance to a reflecting object. Audio speaker 185 provides audio output, including audio playback and alerts. Microphone 186 receives user audible inputs. Ultrasonic proximity sensor 187a or optical proximity sensor 187b detects an object, such as an ear of person 140, touching or nearly touching device housing 188. Optical proximity sensor 187b can also use the infrared (IR) electromagnetic spectrum. Image capturing device 189, such as a camera, can receive gestures and other image data. I/O subsystem 108 can be wholly or substantially encompassed by device housing 188. In one or more embodiments, I/O controller 190 connects to one or more peripheral devices 191 that can provide additional I/O functionality. I/O controller 190 can also interface to a wired local access network (LAN) (not shown).

In one or more embodiments, controller 110 is communicatively coupled to open/closed position sensor 102, and the activity sensor. The activity sensor can include one or more components or functions of input/output subsystem 108 and capacitive proximity detection component 142. Controller 110 executes open/closed position detection utility 172 that enables the mobile electronic device 100 to provide functionality described herein. The functionality can include intermittently activating open/closed position sensor 102 during an on-cycle of a polling interval to sense a position of movable portion 104. The functionality can also include deactivating the open/closed position sensor 102 during an off-cycle of the polling interval to mitigate power consumption by the open/closed position sensor 102. Controller 110 determines, based on data detected by the activity sensor, whether mobile electronic device 100 is in a selected one of: (i) a first activity state; and (ii) a second activity state. The first and second activity states are indicative, respectively, of a first and a second probability of movable portion 104 transitioning between the closed position and the open position. The first probability is lower than the second probability. In one or more embodiments, the first and second states are specific to an initial condition of the movable portion being in a closed position. In one or more embodiments, the first and second states are specific to an initial condition of the movable portion being in an open position. In other embodiments, the first and second states relate to a transition from either a closed position to open position or vice versa. As provided by the disclosure, the open and closed states are not necessarily fully open or fully closed positioning of the movable portion 104, as these states can respectively include a range from a partially closed state to a fully closed state and a partially open state to a fully open state. In response to determining that mobile electronic device 100 is in the first activity state, controller 100 gates or sets the polling interval of open/closed proximity switch 102 to a first polling interval that is selected to increase the length of time between on cycles of the open/closed position switch 102 and thus reduce collective power consumption by the open/closed proximity switch 102 over two or more polling intervals. In response to determining that mobile electronic device 100 is in the second activity state, controller 100 gates or sets the polling interval of open/closed proximity switch 102 to a second polling interval that is shorter than the first polling interval. Use of the second polling interval reduces the period of latency between the on-cycles of the open/closed position switch 102 as compared to the first polling interval, which in turn reduces the response time of the mobile device to activate and/or deactivate functions related to the open/closed position of the movable portion 104.

In one or more embodiments, in response to determining, based on input received from open/closed position sensor 102, that movable portion 104 has transitioned from the closed position to the open position, controller 110 activates user interface device 148. In response to determining, based on the input received from open/closed position sensor 102, that movable portion 104 has transitioned from the open position to the closed position, controller 110 deactivates user interface device 148.

For clarity, two different activity states are described. For example, the first state is associated with detecting an opportunity to conserve power when latency is less important, while the second activity state is not associated with an opportunity to conserve power when latency is important. Activity sensor(s) can detect one or more ambient or internal conditions that: (i) affirmatively indicate the likelihood of a change in position of the movable portion 104; (ii) affirmatively indicate that a change in position of the movable portion 104 is unlikely; or (iii) fail to indicate whether a change in position of the movable portion 104 is likely or unlikely. In one or more embodiments, there are more than one defined activity states that are mutually-exclusive and independently evaluated. In one or more embodiments, an activity state can operate as an exception to another activity state, such as when implementing a hierarchical or serial approach to determining a final activity state. For example, controller 110 can sense motion, which generally indicates a likelihood of a change in the position of the movable portion 104. Another sensor that indicates proximity of a human can be used to find an exception to the activity state.

For example, the exception can be a determination that mobile electronic device 100 is in a glove compartment of a moving vehicle.

In one or more embodiments, the function of the activity sensor is provided, at least in part, by motion sensor 149. Controller 110 determines, based on an input signal received from motion sensor 149, whether mobile electronic device 100 has changed from being in-motion to being motionless. In response to determining that mobile electronic device 100 has changed from being in-motion to being motionless, controller 110 determines that mobile electronic device 100 is in the first activity state. Controller 110 determines, based on an input signal received from motion sensor 149, whether mobile electronic device 100 has changed from being motionless to being in-motion. In response to determining that mobile electronic device 100 has changed from being motionless to being in-motion, controller 110 determines that mobile electronic device 100 is in the second activity state. In this embodiment, the mobile electronic device being motionless may correlate to the device being left on a desktop or other item of furniture and is completely stationary. The mobile electronic device being in-motion may correlate to detecting a sequence of changes in orientation or location.

In one or more embodiments, the function of the activity sensor is provided by one or more of: (i) body capacitance proximity detection sensor 142; (ii) ultrasonic proximity sensor 187a; (iii) optical proximity sensor 187b; (iv) an ambient light sensor 150; (v) motion sensor 149; and (vi) image capturing device 189. Controller 110 determines, based on input from the activity sensor, whether mobile electronic device 100 is stowed in enclosure 146. In response to determining that mobile electronic device 100 is stowed in enclosure 146, controller 100 determines that mobile electronic device 100 is in the first activity state. In alternate embodiments, enclosure 146 can be or can represent a vehicle compartment, a drawer of an item of furniture. The enclosure 146 can be luggage or shipping packaging. In one or embodiments, the stowed state is an exception to an in-motion state. A determination of being in the stowed state can require a combination of determined factors depending on what activity sensors are available. For example, controller 100 can detect that a time of day or location within a facility corresponds with a low light condition rather than being indicative of being within enclosure 146. For another example, an activity sensor that can detect capacitive skin contact to a touch screen can be used in determining that the device is not being stowed.

In one or more embodiments, the function of the activity sensor is provided by one or more of: (i) body capacitance proximity detection sensor 142; (ii) ultrasonic proximity sensor 187a; (iii) optical proximity sensor 187b; (iv) ambient light sensor 150; (v) motion sensor 149; (vi) image capturing device 189; (vii) microphone 186; and (viii) range finder 184. Controller 110 determines, based on input from the activity sensor, whether mobile electronic device 110 is in proximity to a user, such as person 140. In response to determining that mobile electronic device 100 is not in proximity to a user, controller 110 determines that mobile electronic device 100 is in the first activity state. In response to determining that mobile electronic device 100 is in proximity to a user, controller 110 determines that mobile electronic device 100 is in the second activity state.

In one or more embodiments, in response to determining that mobile electronic device 100 has transitioned from the first activity state to the second activity state, controller 110 triggers an immediate polling of open/closed position sensor 102.

In one or more embodiments, open/closed position sensor 102 includes a differential inductive switch 192, such as Model LDC0851 by TEXAS INSTRUMENTS. Induction by sensing coil 193 senses proximity to movable conductive target 194. Inductive sensing is immune to temperature, humidity and mechanical contact failure. Differential inductive switch 192 does not include magnets, and as such, there is no opportunity for differential inductive switch 192 to inadvertently interact with environmental items, as with a conventional Hall Effect sensor. In one or more embodiments, differential inductive switch 192 can be configured using two identical coils including sensing coil 193 and reference coil 195 that are identically energized. In one or more embodiments, a fixed conductive target (not shown) is aligned with reference coil 195 at a fixed distance. The switching point occurs when the inductances of both coils 193, 195 are equal. In one or more embodiments, a fixed conductive target is not used. With these embodiments, an offset inductance is subtracted from the measurement by reference coil 195 to adjust the switching distance of movable conductive target 195.

Differential inductive switch 192 requires energization from power provided by power supply 196. Current drain of about 2 mA at 3.3 V can be experienced if operating differential inductive switch 192 continuously. To reduce the amount of power consumed by differential inductive switch 192, detection of position is accomplished using a polling sequence in which differential inductive switch 192 is only energized/enabled for a few milliseconds (ms) during each polling interval. The amount of reduction in overall current drain is thus related to the polling rate. Examples of polling rate and the corresponding amounts of current drain by differential inductive switch 192 are included in TABLE 1:

TABLE 1

| Poll Rate (Hz) | Current Adder (µA) |
|---|---|
| 1 | 65 |
| 5 | 290 |
| 10 | 460 |

Since the on-cycle of polling interval is relatively short as compared to the off-cycle, the additional current ("current adder") required for higher polling rate is approximately linear.

Figure 2A:
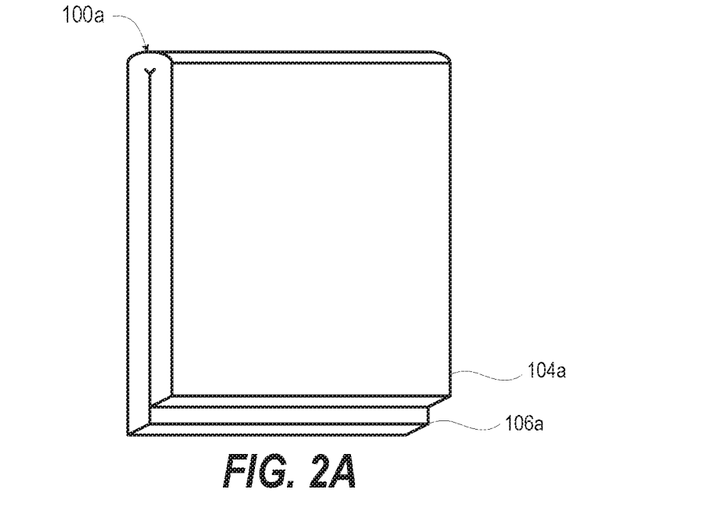
FIG. 2A is a front isometric view of an example mobile electronic device, in a folded, closed position, according to one or more embodiments.
Figure 2B:
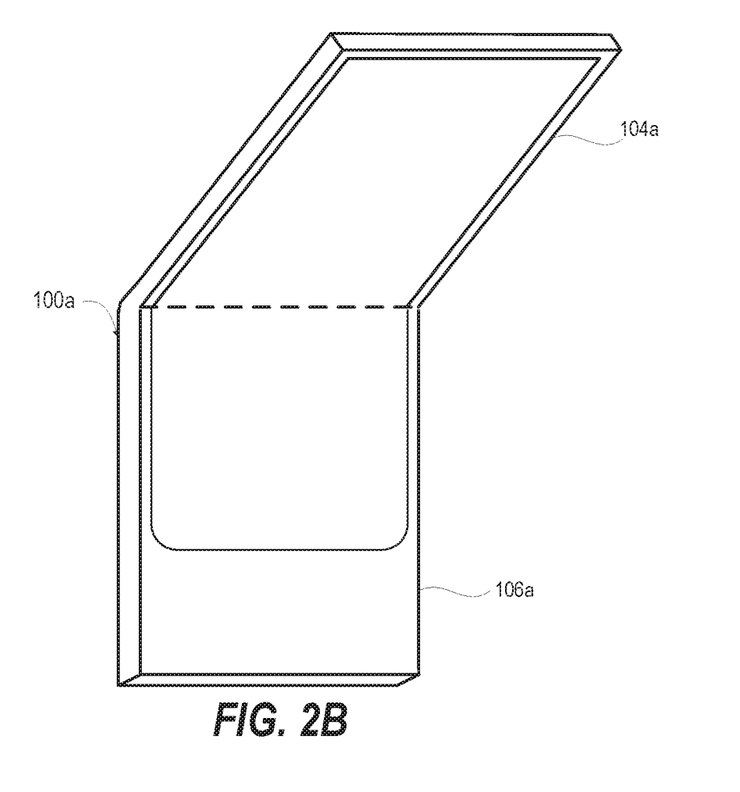
FIG. 2B is a front isometric view of the example mobile electronic device of FIG. 2A in a partially open position, according to one or more embodiments.
Figure 2C:
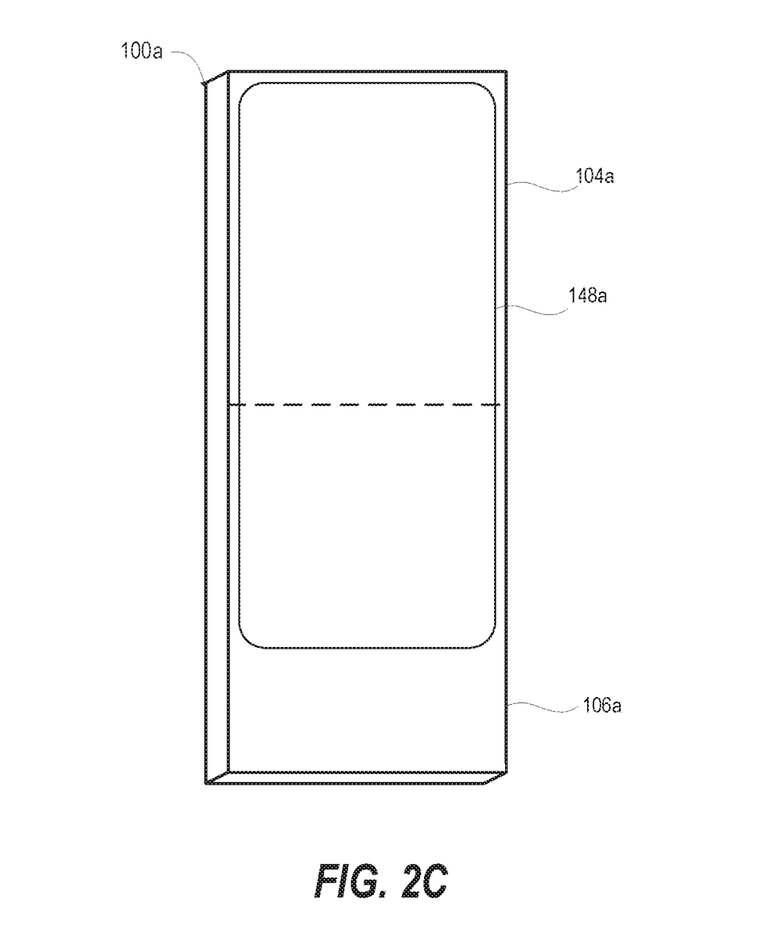
FIG. 2C is a front isometric view of the example mobile electronic device of FIG. 2A in a fully open position, according to one or more embodiments.

FIGS. 2A-C illustrate different positional views of mobile electronic device 100a having movable portion 104a pivotally connected to base 106a. FIG. 2A presents mobile electronic device 100a in a folded, closed position. In one or more embodiments, the activity state is determinative of latency only when in the folded, closed state. A user can have an expectation, for example, of having a user interface enabled promptly upon unfolding and opening the movable portion 104a. Conversely, a user may be unable to ascertain or have no concern for how long it takes to deactivate a user interface after folding and closing the movable portion 104a. Other functions can be triggered based on the open/closed position of the movable portion 104a. Certain components and functions are deactivated in a particular activity state based on not being user accessible. Certain components and functions can be activated in this activity state, such as hands free operations or linking to remote user interfaces. FIG. 2B depicts mobile electronic device 100a in a partially open state. Determining that an open event has occurred can require a certain amount of actuation from a closed to an open state to occur. For example, the threshold for determining that mobile electronic device 100a is in the open position can require a large portion, but not all, of the movement of movable portion 104a away from folded alignment with base 106a. FIG. 2C shows mobile electronic device 100a in a fully open position, fully exposing user interface device 148. For clarity, user interface device 148 that is attached to both movable portion 104a and base 106a. In one or more embodiments, user interface device 148 is attached to one of movable portion 104a and base 106a. In one or more embodiments, user interface device 148 is not visibly disposed on either of the movable portion 104a and base 106a. Movable portion 104a can provide another feature and/or function such as an extendable antenna that triggers a change in operation of the mobile electronic device 100a.

Figure 3A:
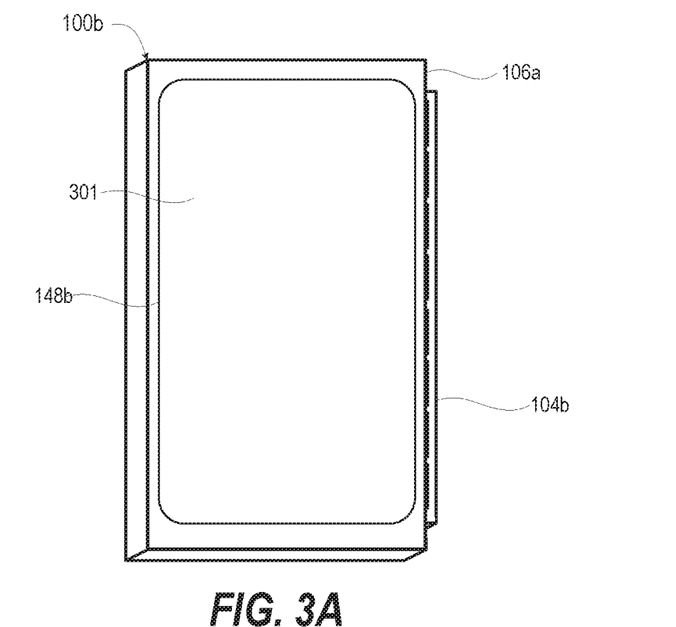
FIG. 3A is a front isometric view of an example mobile electronic device with a movable portion in a retracted, closed position, according to one or more embodiments.
Figure 3B:
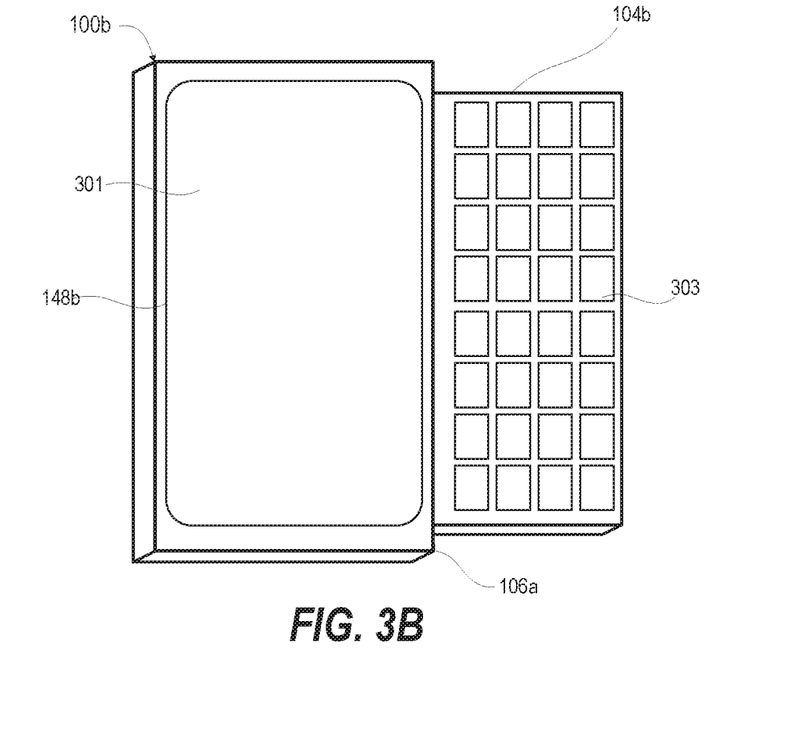
FIG. 3B is a front isometric view of the example mobile electronic device of FIG. 3A with a movable portion in an extended, open position, according to one or more embodiments.

FIG. 3A illustrates a closed position of mobile electronic device 100b having movable portion 104b that is in planar alignment with base 106a. Movable portion 104b is received for sliding movement and is in retracted, closed position. FIG. 3B depicts movable portion 104b in an extended, open position. In one or more embodiments, base 104a includes a touch screen portion 301 of user interface 148b and movable portion 104b includes keypad portion 303 of user interface 148b. It is appreciated that the inverse configuration of mobile electronic device 100 is also possible. In one or more embodiments, other functionality is selectively hidden and selectively exposed based on the position of the movable portion 104b.

Figure 4A:
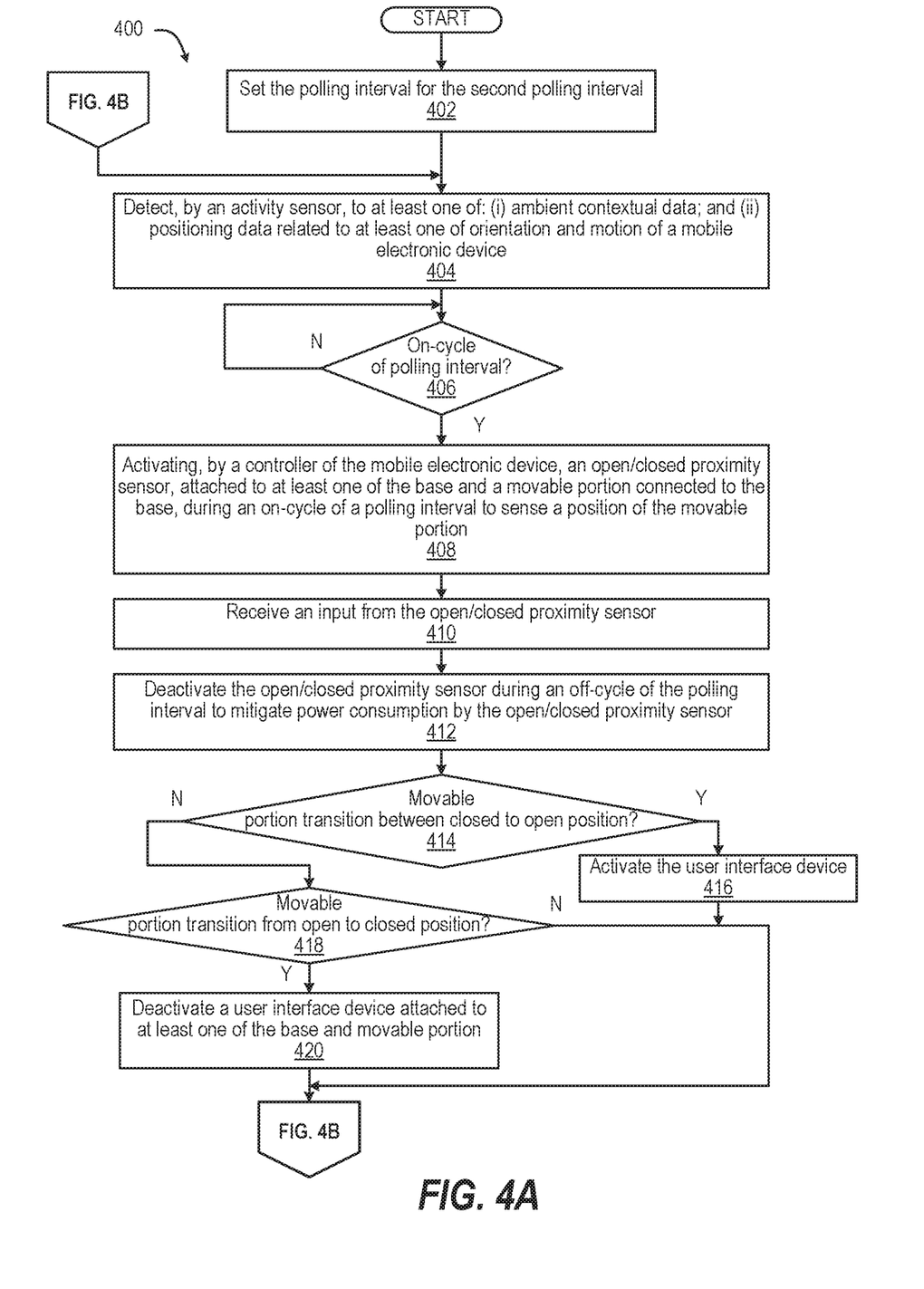
FIGS. 4A-B is a flow diagram of a method of balancing power consumption of an inductive proximity sensor and a latency in activating or deactivating components and functions of the mobile electronic device following an open/close event, according to one or more embodiments.
Figure 4B:
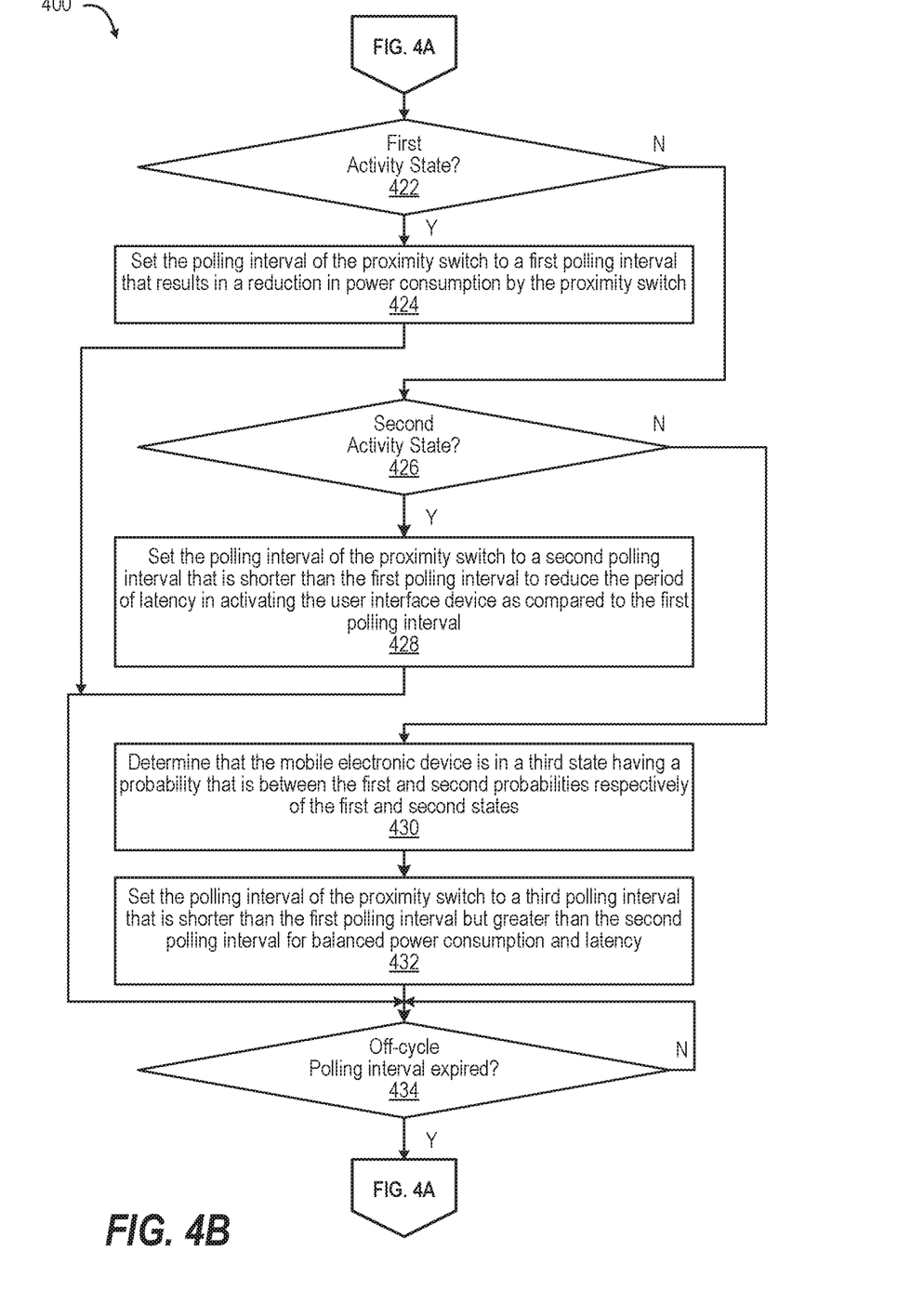

FIGS. 4A-B provide method 400 of balancing power consumption of an inductive proximity sensor and latency in activating or deactivating certain components and/or functions of mobile electronic device 100 (FIG. 1) following an open/close event. In one or more embodiments, inductive proximity sensor is proximity sensor 102 (FIG. 2). In an exemplary embodiment, inductive proximity sensor is differential inductive switch 192 communicatively coupled to sensing coil 193 that is aligned with movable conductive target 194. With initial reference to FIG. 4A, method 400 includes setting the polling interval to a default polling interval (block 402). In one or more embodiments, the default polling interval is the second polling interval that satisfies the shortest latency requirement. The default polling interval is maintained until an opportunity is detected for adjusting the polling interval for a longer duration that results in overall lower power consumption. Method 400 includes detecting, by an activity sensor, one or more of: (i) ambient contextual data; and (ii) positioning data related to at least one of orientation and motion of a mobile electronic device (block 404). The activity sensor can include one or more components or functions of input/output subsystem 108 and capacitive proximity detection component 142 (FIG. 1). A determination is made in decision block 406 whether an on-cycle of the polling interval has started. In response to determining that the on-cycle has not started, method 400 returns to decision block 406. In response to determining that the on-cycle has started, method 400 includes activating, by a controller of the mobile electronic device, an open/closed position sensor, attached to at least one of the base and a movable portion connected to the base, during an on-cycle of a polling interval to sense a position of the movable portion (block 408). Method 400 includes receiving an input signal from the open/closed position sensor (block 410). Method 400 includes deactivating the open/closed position sensor during an off-cycle of the polling interval to mitigate power consumption by the open/closed position sensor (block 412). A duration of the off-cycle defines a period of latency in detecting an open/closed event involving a transition between the open and closed positions of the movable portion. A determination is made at decision block 414, based on the input received from the open/closed position sensor, whether the movable portion has transitioned from the closed position to the open position. In response to determining that the movable portion has transitioned from the closed position to the open position, method 400 includes activating the user interface device (block 416). For clarity, activating and deactivating is illustrated, based on the position of the movable portion. The position of the movable portion can be used for other components and functions.

In response to determining that the movable portion has not transitioned from the closed position to the open position, a determination is made at decision block 418, based on the input received from the open/closed position sensor, whether the movable portion has transitioned from the open position to the closed position. In response to determining that the movable portion has transitioned from the open position to the closed position, method 400 includes deactivating a user interface device attached to at least one of the base and movable portion (block 420). In one or more embodiment, transitioning to the closed position can activate or deactivate other functions and components. The user interface device is exposed when the movable portion is in the open position. The user interface device is at least partially hidden when the movable portion is in the closed position.

Continuing in FIG. 4B, In response to determining that the movable portion has not transitioned from the open position to the closed position, at decision block 418 or after block 416 or block 420, method 400 includes determining at decision block 422, based on data detected by the activity sensor, whether the mobile electronic device is in a first activity state. The first activity state and a second activity state are indicative respectively of a first and a second probability of the movable portion being moved from the closed position to the open position. Within the described embodiments, the first probability is lower than the second probability. In response to determining that the mobile electronic device is in the first activity state, method 400 includes setting the polling interval of the open/closed proximity switch to a first polling interval that results in a reduction in power consumption by the open/closed proximity switch (block 424). In response to determining that the mobile electronic device is not in the first activity state, a determination is made at decision block 426 whether the mobile electronic device is in the second activity state. In response to determining that the mobile electronic device is in the second activity state, method 400 includes setting the polling interval of the open/closed proximity switch to a second polling interval that is shorter than the first polling interval and reduces the period of latency in activating the user interface device, as compared to latency associated with the first polling interval (block 428).

In one or more embodiments, the dynamic balancing of power consumption and latency can have more than two levels of polling intervals. For example, in response to determining that the mobile electronic device is not in the second activity state in decision block 426, method 400 includes determining that the mobile electronic device is in a third state having a probability that is between the first and second probabilities respectively of the first and second states (block 430). Method 400 includes setting the polling interval of the open/closed proximity switch to a third polling interval that is shorter than the first polling interval but greater than the second polling interval (block 432). The third polling interval provides a balance of power consumption by the switch and latency of responding to an open/close event. After either of block 424, 428, or 432, a determination is made in decision block 434 whether the off-cycle polling interval has expired. In response to determining that the off-cycle polling interval has not expired, method 400 returns to decision block 434. In response to determining that the off-cycle polling interval has expired, method 400 returns to block 404.

Figure 5A:
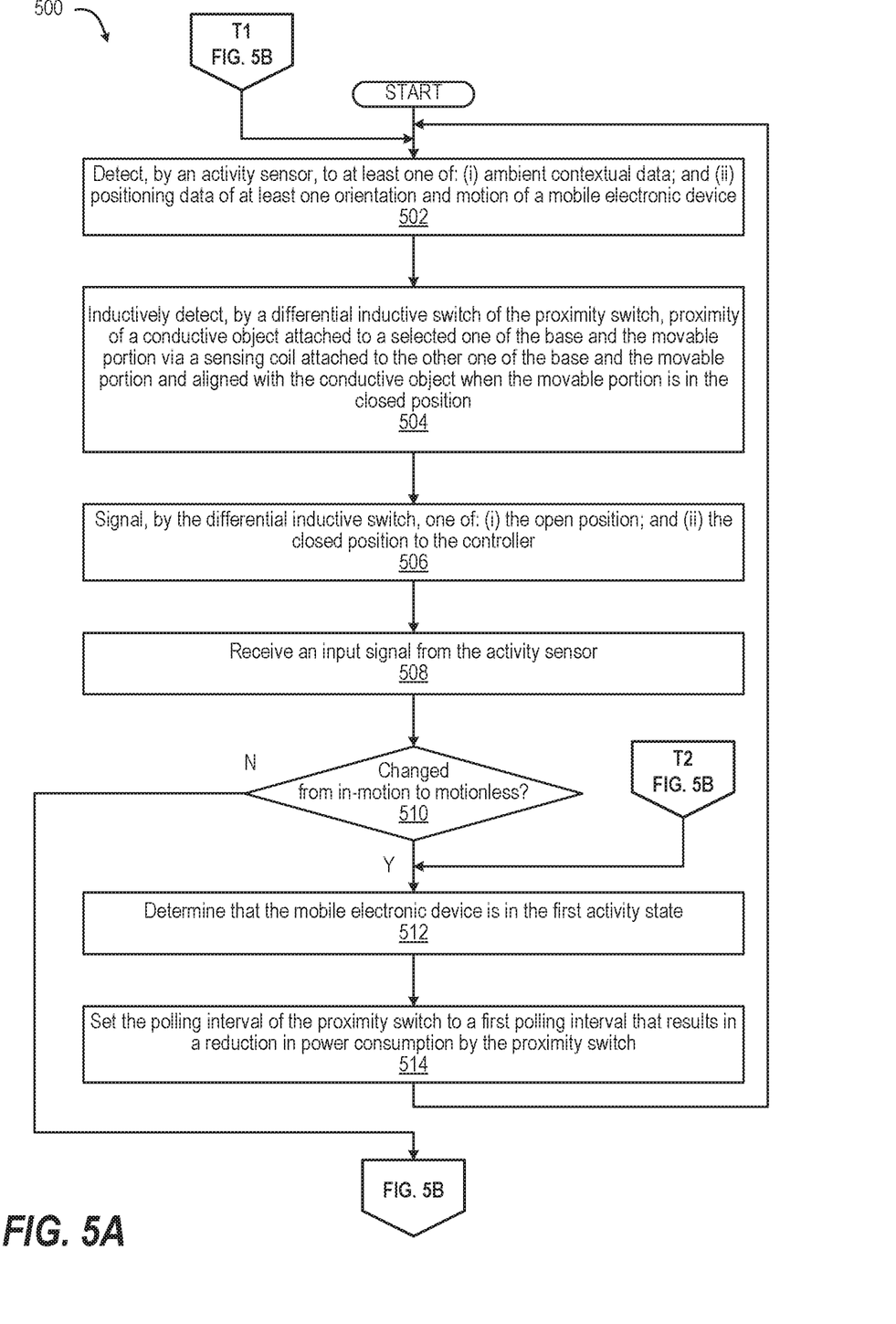
FIGS. 5A-B provide a flow diagram of a method of dynamically balancing power consumption with a latency of an open/close event detection, in particular use cases of a mobile electronic device, according to one or more embodiments.
Figure 5B:
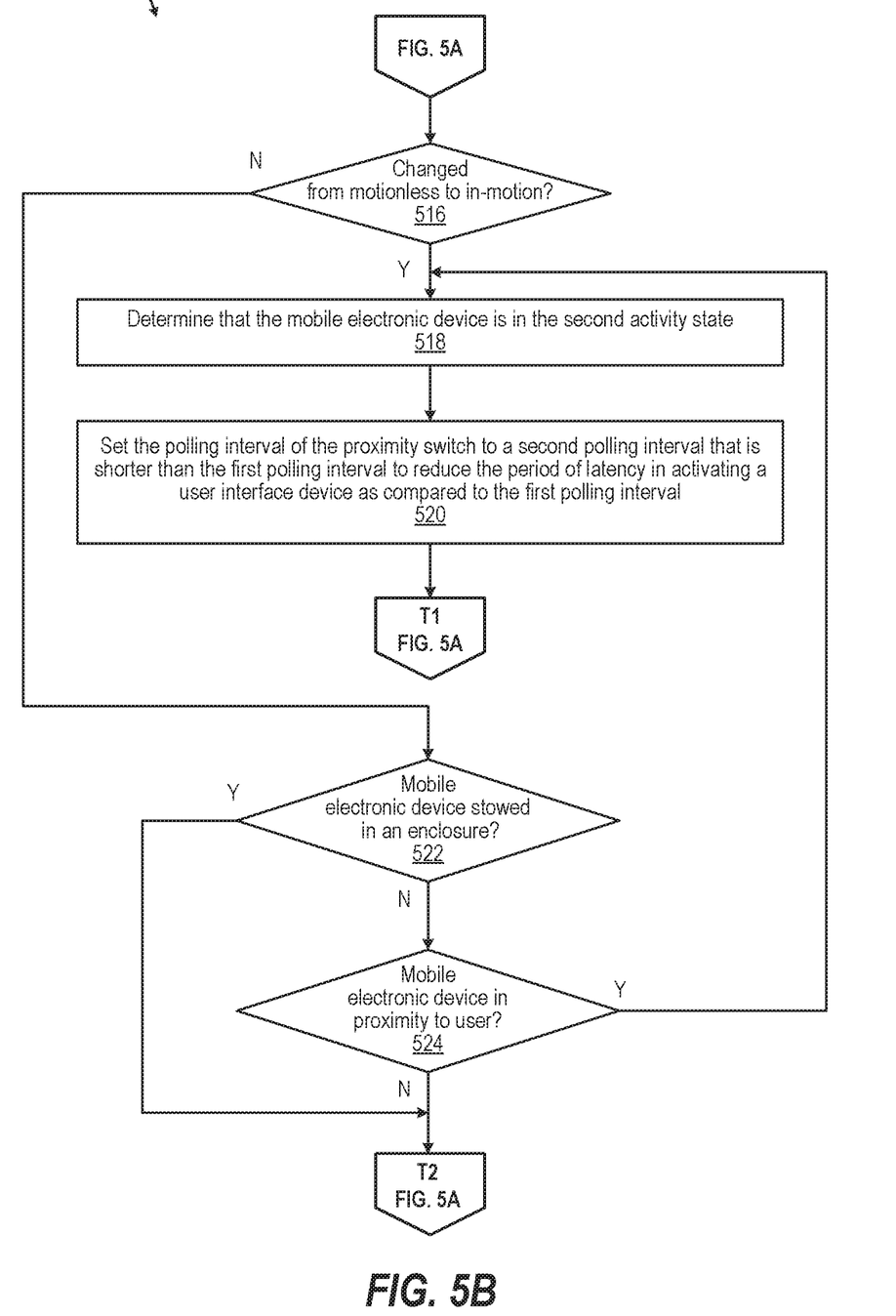

FIGS. 5A-B present method 500 of dynamically balancing power consumption of a reliable inductive proximity sensor with a latency of open/close event detection in particular use cases of mobile electronic device 100 (FIG. 1). With initial reference to FIG. 5A, method 500 includes detecting, by an activity sensor, at least one of: (i) ambient contextual data; and (ii) positioning data of at least one of orientation and motion of a mobile electronic device (block 502). Method 500 includes inductively detecting, by a differential inductive switch of the open/closed proximity switch, proximity of a conductive object attached to a selected one of the base and the movable portion via a sensing coil attached to the other one of the base and the movable portion (block 504). The sensing coil is aligned with the conductive object when the movable portion is in the closed position. Method 500 includes signaling to the controller, by the differential inductive switch, one of: (i) the open position; and (ii) the closed position (block 506).

Method 500 includes receiving an input signal from the activity sensor (block 508). In one or more embodiments, method 500 includes determining at decision block 510, based on the input signal received from the activity sensor, whether the mobile electronic device has changed from being in-motion to being relatively motionless. Motionless can be defined as having only minor vibrations of an amplitude common to a piece of furniture or a vehicle upon which a mobile electronic device is placed. In-motion, by contrast can be defined as having at least occasional movements defined in seconds as greater than a threshold set for what occurs when a person is holding or carrying a mobile electronic device. In response to determining that the mobile electronic device has changed from being in-motion to being relatively motionless, method 500 includes determining that the mobile electronic device is in the first activity state (block 512). Method 500 includes setting the polling interval of the open/closed proximity switch to a first polling interval that results in a reduction of power consumption by the open/closed proximity switch (block 514). Then method 500 returns to block 502.

Continuing in FIG. 5B, in response to determining that the mobile electronic device has not changed from being in-motion to being relatively motionless at decision block 510, method 500 includes determining at decision block 516, based on the input signal received from the activity sensor, whether the mobile electronic device has changed from being relatively motionless to being in-motion. In response to determining that the mobile electronic device has changed from being relatively motionless to being in-motion, method 500 includes determining that the mobile electronic device is in the second activity state (block 518). Method 500 includes setting the polling interval of the open/closed proximity switch to a second polling interval that is shorter than the first polling interval (block 520). Setting the polling interval to the second polling interval reduces the period of latency in activating a user interface device, as compared to the latency associated with the first polling interval. Then method 500 returns to block 502.

In response to determining at decision block 516 that the mobile electronic device has not changed from being motionless to being in-motion, method 500 includes determining at decision block 522, based on input from the activity sensor, whether the mobile electronic device is stowed in an enclosure. For example, the activity sensor can detect that ambient light is being blocked by material close to the mobile electronic device sensed by an optical proximity sensor which correlates to being in a handbag. Sensors of different types can provide information that in combination indicates whether or not the mobile electronic device is stowed within an enclosure or not. In one or more embodiments, a time of day can be incorporated into a light threshold for determining whether the mobile electronic device is being exposed to ambient light or is being stowed. In one or more embodiments, the activity sensor can further detect, based on range finding or capacitive coupling with a communication antenna of the mobile electronic device, that a body of a user is near, but not touching, the mobile electronic device, such as by being in a pocket of a garment worn by the user. In response to determining that the mobile electronic device is stowed in an enclosure, method 500 returns to block 512.

In one or more embodiments, each activity state can be independently determined or the solitary use case assessed by mobile electronic device 100 (FIG. 1). In one or more embodiments, based on a time of time or location services that indicate being possibly within a building, method 500 cannot determine whether or not the mobile electronic device 100 is stowed. Activity state can be based on how proximate the mobile electronic device is to a user and the nature of the movement of the mobile electronic device.

In response to determining that the mobile electronic device is not stowed in an enclosure, method 500 includes determining at decision block 524, based on input from the activity sensor, whether the mobile electronic device is in proximity to a user. For example, activity sensor can detect a user based on monitoring a microphone, a camera, a range finder, human proximity capacitive coupling to a communication antenna, etc. In response to determining that the mobile electronic device is in proximity to a user, method 500 returns to block 518. In response to determining that the mobile electronic device is not in proximity to a user, method 500 returns to block 512.

In one or more embodiments, method 500 includes, in response to determining that the mobile electronic device has transitioned from the first activity state to the second activity state, triggering an immediate polling of the open/closed position sensor.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation.

It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a base;
a movable portion connected to the base;
an open/closed position sensor attached to at least one of the base and the movable portion and electrically actuated to detect at least one of an open position and a closed position of the movable portion relative to the base;
an activity sensor that detects one or more of: (i) ambient contextual data; and (ii) positioning data related to at least one of orientation and motion of the electronic device; and
a controller communicatively coupled to the open/closed position sensor, and the activity sensor and which executes an open/closed position detection utility that enables the electronic device to:
intermittently activate the open/closed position sensor during an on-cycle of a polling interval to sense a position of the movable portion and deactivate the open/closed position sensor during an off-cycle of the polling interval to mitigate power consumption by the open/closed position sensor, a duration of the off-cycle defining a period of latency in detecting an open/closed event involving a transition between the open and closed positions of the movable portion;
determine, based on data detected by the activity sensor, whether the electronic device is in a selected one of: (i) a first activity state; and (ii) a second activity state, the first and second activity states are indicative, respectively, of a first and a second probability of the movable portion transitioning between the closed position and the open position, the first activity state being associated with detecting an opportunity to conserve power when latency in detection of the open/closed position is not important and the second activity state not being associated with an opportunity to conserver power when the latency in detection is important;
in response to determining that the electronic device is in the first activity state, set the polling interval of the open/closed position sensor to a first polling interval that reduces power consumption by the open/closed proximity switch; and
in response to determining that the electronic device is in the second activity state, set the polling interval of the open/closed proximity switch to a second polling interval that is shorter than the first polling interval to reduce the period of latency as compared to the first polling interval.

2. The electronic device of claim 1, wherein the first probability is lower than the second probability.

3. The electronic device of claim 1, further comprising a user interface device attached to at least one of the base and movable portion, the user interface device being exposed when the movable portion is in an open position and the user interface device being at least partially hidden when the movable portion is in the closed position, wherein the controller enables the electronic device to:
in response to determining, based on input received from the open/closed position sensor, that the movable portion has transitioned from the closed position to the open position, activate the user interface device; and
in response to determining, based on the input received from the open/closed position sensor, that the movable portion has transitioned from the open position to the closed position, deactivate the user interface device.

4. The electronic device of claim 1, wherein the open/closed position sensor comprises:
a conductive object attached to a selected one of the base and the movable portion;

a sensing coil attached to the other one of the base and the movable portion and aligned with the conductive object when the movable portion is in the closed position; and a differential inductive switch communicatively coupled to the sensing coil to inductively detect proximity to the conductive object and to signal one of: (i) the open position; and (ii) the closed position to the controller.

5. The electronic device of claim 1, wherein:

the activity sensor comprises a motion sensor; and the controller enables the electronic device to:
  determine, based on an input signal received from the motion sensor, whether the electronic device has changed from being in-motion to being motionless;
  in response to determining that the electronic device has changed from being in-motion to being motionless, determine that the electronic device is in the first activity state;
  determine, based on an input signal received from the motion sensor, whether the electronic device has changed from being motionless to being in-motion; and
  in response to determining that the electronic device has changed from being motionless to being in-motion, determine that the electronic device is in the second activity state.

6. The electronic device of claim 1, wherein:

the activity sensor comprises one or more of: (i) a body capacitance proximity sensor; (ii) ultrasonic proximity sensor; (iii) optical proximity sensor; (iv) ambient light sensor; (v) a motion sensor; and (vi) an image capturing device; and the controller enables the electronic device to:
  determine, based on input from the activity sensor, whether the electronic device is stowed in an enclosure;
  in response to determining that the electronic device is stowed in the enclosure, determine that the electronic device is in the first activity state.

7. The electronic device of claim 1, wherein:

the activity sensor comprises one or more of: (i) a body capacitance proximity sensor; (ii) ultrasonic proximity sensor; (iii) optical proximity sensor; (iv) ambient light sensor; (v) a motion sensor; (vi) an image capturing device; (vii) a microphone; and (viii) a range finder; and the controller enables the electronic device to:
  determine, based on input from the activity sensor, whether the electronic device is in proximity to a user;
  in response to determining that the electronic device is not in proximity to a user, determine that the electronic device is in the first activity state; and
  in response to determining that the electronic device is in proximity to a user, determine that the electronic device is in the second activity state.

8. A method comprising:

detecting, by an activity sensor, one or more of: (i) ambient contextual data; and (ii) positioning data related to at least one of orientation and motion of an electronic device;

intermittently activating, by a controller of the electronic device, an open/closed position sensor, attached to at least one of the base and a movable portion connected to the base, during an on-cycle of a polling interval to sense a position of the movable portion and deactivating the open/closed position sensor during an off-cycle of the polling interval to mitigate power consumption by the open/closed position sensor, a duration of the off-cycle defining a period of latency in detecting an open/closed event involving a transition between the open and closed positions of the movable portion;

determining, based on data detected by the activity sensor, whether the electronic device is in a selected one of: (i) a first activity state; and (ii) a second activity state, the first and second activity states are indicative, respectively, of a first and a second probability of the movable portion transitioning between the closed position and the open position, the first activity state being associated with detecting an opportunity to conserve power when latency in detection of the open/closed position is not important and the second activity state not being associated with an opportunity to conserver power when the latency in detection is important;

in response to determining that the electronic device is in the first activity state, setting the polling interval of the open/closed position sensor to a first polling interval that reduces power consumption by the open/closed proximity switch; and in response to determining that the electronic device is in the second activity state, setting the polling interval of the open/closed proximity switch to a second polling interval that is shorter than the first polling interval to reduce the period of latency as compared to the first polling interval.

9. The method of claim 8, further comprising: in response to determining that the electronic device has transitioned from the first activity state to the second activity state, triggering an immediate polling of the open/closed position sensor.

10. The method of claim 8, further comprising:

in response to determining, based on input received from the open/closed position sensor, that the movable portion has transitioned from the closed position to the open position, activating a user interface device; and in response to determining, based on the input received from the open/closed position sensor, that the movable portion has transitioned from the open position to the closed position, deactivating a user interface device attached to at least one of the base and movable portion, the user interface device being exposed when the movable portion is in the open position and the user interface device being at least partially hidden when the movable portion is in the closed position.

11. The method of claim 8, wherein intermittently activating the open/closed position sensor comprises:

inductively detecting, by a differential inductive switch, proximity of a conductive object attached to a selected one of the base and the movable portion via a sensing coil attached to the other one of the base and the movable portion and aligned with the conductive object when the movable portion is in the closed position; and signaling one of: (i) the open position; and (ii) the closed position to the controller.

12. The method of claim 8, wherein:

determining, based on an input signal received from the activity sensor, whether the electronic device has changed from being in-motion to being motionless;

in response to determining that the electronic device has changed from being in-motion to being motionless, determining that the electronic device is in the first activity state;

determining, based on an input signal received from the activity sensor, whether the electronic device has changed from being motionless to being in-motion; and in response to determining that the electronic device has changed from being motionless to being in-motion, determining that the electronic device is in the second activity state.

13. The method of claim 8, wherein:

determining, based on input from the activity sensor, whether the electronic device is stowed in an enclosure;

in response to determining that the electronic device is stowed in the enclosure, determining that the electronic device is in the first activity state.

14. The method of claim 8, wherein:

determining, based on input from the activity sensor, whether the electronic device is in proximity to a user;

in response to determining that the electronic device is not in proximity to a user, determining that the electronic device is in the first activity state; and in response to determining that the electronic device is in proximity to a user, determining that the electronic device is in the second activity state.

15. A computer program product comprising:

a computer readable storage device; and program code on the computer readable storage device that when executed by a processor associated with an electronic device, the program code enables the electronic device to provide the functionality of:

detecting, by an activity sensor, one or more of: (i) ambient contextual data; and (ii) positioning data related to at least one of orientation and motion of an electronic device;

intermittently activating, by a controller of the electronic device, an open/closed position sensor, attached to at least one of the base and a movable portion connected to the base, during an on-cycle of a polling interval to sense a position of the movable portion and deactivating the open/closed position sensor during an off-cycle of the polling interval to mitigate power consumption by the open/closed position sensor, a duration of the off-cycle defining a period of latency in detecting an open/closed event involving a transition between the open and closed positions of the movable portion;

determining, based on data detected by the activity sensor, whether the electronic device is in a selected one of: (i) a first activity state; and (ii) a second activity state, the first and second activity states are indicative, respectively, of a first and a second probability of the movable portion transitioning between the closed position and the open position, the first activity state being associated with detecting an opportunity to conserve power when latency in detection of the open/closed position is not important and the second activity state not being associated with an opportunity to conserver power when the latency in detection is important;

in response to determining that the electronic device is in the first activity state, setting the polling interval of the open/closed position sensor to a first polling interval that reduces power consumption by the open/closed position switch; and in response to determining that the electronic device is in the second activity state, setting the polling interval of the open/closed position switch to a second polling interval that is shorter than the first polling interval to reduce the period of latency as compared to the first polling interval.

16. The computer program product of claim 15, wherein the program code enables the electronic device to provide the functionality of:

in response to determining, based on input received from the open/closed position sensor, that the movable portion has transitioned between the closed position and the open position, activating a user interface device; and in response to determining, based on the input received from the open/closed position sensor, that the movable portion has transitioned from the open position to the closed position, deactivating a user interface device attached to at least one of the base and movable portion, the user interface device being exposed when the movable portion is in the open position and the user interface device being at least partially hidden when the movable portion is in the closed position.

17. The computer program product of claim 15, wherein, to intermittently activate the open/closed position sensor, the program code enables the electronic device to provide the functionality of:

inductively detecting, by a differential inductive switch, proximity of a conductive object attached to a selected one of the base and the movable portion via a sensing coil attached to the other one of the base and the movable portion and aligned with the conductive object when the movable portion is in the closed position; and signaling one of: (i) the open position; and (ii) the closed position to the controller.

18. The computer program product of claim 15, wherein the program code enables the electronic device to provide the functionality of:

determining, based on an input signal received from the activity sensor, whether the electronic device has changed from being in-motion to being motionless;

in response to determining that the electronic device has changed from being in-motion to being motionless, determining that the electronic device is in the first activity state.

19. The computer program product of claim 15, wherein the program code enables the electronic device to provide the functionality of:

determining, based on an input signal received from the activity sensor, whether the electronic device has changed from being motionless to being in-motion;

in response to determining that the electronic device has changed from being motionless to being in-motion, determining that the electronic device is in the second activity state;

determining, based on input from the activity sensor, whether the electronic device is stowed in an enclosure; and in response to determining that the electronic device is stowed in the enclosure, determining that the electronic device is in the first activity state.

20. The computer program product of claim 15, wherein the program code enables the electronic device to provide the functionality of:

determining, based on input from the activity sensor, whether the electronic device is in proximity to a user;

in response to determining that the electronic device is not in proximity to a user, determining that the electronic device is in the first activity state; and in response to determining that the electronic device is in proximity to a user, determining that the electronic device is in the second activity state.

* * * * *